United States Patent [19]
Broll et al.

[11] 3,876,441
[45] Apr. 8, 1975

[54] INORGANIC PIGMENTS

[75] Inventors: Arno Broll, Rothenbergen; Herbert Mann, Dornigheim, both of Germany

[73] Assignee: Deutsche Gold- und Silber-Scheideanstalt vormals Roessler, Frankfurt, Germany

[22] Filed: May 3, 1974

[21] Appl. No.: 466,894

[30] Foreign Application Priority Data
May 10, 1973 Germany............................ 2323480

[52] U.S. Cl. ................. 106/299; 106/292; 423/598
[51] Int. Cl. ............................................... C09c 1/36
[58] Field of Search ............. 106/292, 299; 423/598

[56] References Cited
UNITED STATES PATENTS

| | | | |
|---|---|---|---|
| 3,413,083 | 11/1968 | Daendliker | 423/598 |
| 3,424,551 | 1/1969 | Owen | 106/292 |

*Primary Examiner*—Winston A. Douglas
*Assistant Examiner*—J. V. Howard
*Attorney, Agent, or Firm*—Cushman, Darby & Cushman

[57] ABSTRACT

Inorganic blue-green pigments are prepared having the composition of $Me_2(Co_xZn_yCd_z)Ti_3O_8$ where Me is an alkali metal and $x + y + z$ is 1. The pigments are useful for coloring plastics.

12 Claims, No Drawings

INORGANIC PIGMENTS

The present invention is directed to novel turquoise colored pigments which are especially suitable for coloring synthetic resins.

Inorganic pigments can be extremely stable to light and temperature. Therefore, they are frequently preferred to organic pigments in fields of application in which special fastness properties are required, for example, for coloring synthetic resins which will not fade in sunlight or for thermoplastic synthetic resins whose high processing temperatures limits the use of organic dyestuffs.

The coloring scale of red and yellow inorganic pigments is completely covered by the cadmium sulfoselenides. In the blue and green range besides the ultramarine pigments there are primarily offered cobalt pigments. The latter structurally belong to the spinels and are distinguished by especial fastness. There are known the reddish Thenard's blue ($CoAl_2O_4$), green Co/Ni/Ti-spinels and blue-green pigments having the composition $Co(Al,Cr)_2O_4$. The green and blue-green types, however, are not especially brilliant and do not form a color pure contrast to the bright cadmium red pigments.

This disadvantage is caused by the two chromophores (Ni or Cr) beside the Co in the crystal lattice of the known pigments, which causes a mixed color that naturally cannot be color pure. If a blue-green pigment is to be especially brilliant then there can only be built into the crystal lattice of the compound one colored ion.

Therefore, it was the problem of the present invention to produce an inorganic pigment which has a brilliant blue-green pigmentation.

It has now been found according to the invention that spinels of the composition $Me_2(Co_xZn_yCd_z)Ti_3O_8$ (I) are suitable as brilliant blue-green pigments, preferably for coloring synthetic resins and lacquers but also generally useful as extremely heat and light stable pigments. Me stands for one or more alkali metals, e.g., lithium, sodium, potassium, rubidium or cesium and $x$, $y$ and $z$ together total 1. The titanium portion can be replaced by tin in an amount up to 10 molar %.

Compounds of the formula $Li_2(Co_xZn_yCd_z)Ti_3O_8$ have proven especially good as brilliant blue-green pigments.

Corresponding to the smaller lattice distance Cd free compounds are less greenish than cadmium containing compounds. In this manner there are obtained brilliant turquoise pigments of the composition $Li_2(Co_xZn_y)Ti_3O_8$ wherein $x + y$ is 1.

Especially suitable are compounds in which the molar ratio of Co:Zn is between 0.5:1 and 4:1. The value of $x$ is desirably 0.33 to 0.8.

As examples of plastics or synthetic resins with which the pigments of the present invention can be used there may be mentioned polyethylene, polypropylene, polystyrene, polyvinyl chloride, polytetrafluoroethylene, polyvinylidene fluoride, vinylidene chloride-vinyl chloride copolymer, styrene-acrylonitrile copolymer, ABS terpolymer, urea-formaldehyde resin, melamine-formaldehyde resin, phenol-formaldehyde resin, polycarbonates, polyoxymethylene resins (e.g., Delrin and Celcon), and nylon.

The pigments of the invention are formed by annealing mixtures of $Li_2O$ (or other alkali metal oxide, e.g., $Na_2O$ or $K_2O$) CoO, ZnO, CdO and $TiO_2$ or compounds which form such oxides in the annealing process. The number of moles of CoO, ZnO and CdO can vary between 0 and 1 according to the general formula I above. The maximum reaction temperature generally is between 800° C. and 1100° C.

According to x-ray analysis all of the pigments consist of homogenous, well-crystallized compounds having a spinel structure. For each stipulated $x$, $y$ and $z$ these compounds have a typical lattice constant $a$, which is between 8.54 and 8.37 A.

The following examples further illustrate the pigments of the invention and their method of production.

EXAMPLE 1

30 grams of $Li_2CO_3$, 15 grams of CoO, 26 grams of CdO and 92 grams of $TiO_2$ were homogenized with 55 ml of water. The kneaded mixture was annealed for 30 minutes at 900° C. and ground in a ball mill. There was obtained a blue-green pigment.

EXAMPLE 2

966 grams of $Li_2Co_3$, 491 grams of CoO, 534 grams of ZnO and 3,010 grams of $TiO_2$ were made into a paste with 2 liters of water and homogenized. After annealing for 30 minutes at 950° C. there was formed a brilliant turquoise body which was used as a pigment after grinding.

EXAMPLE 3

32 grams of $Li_2CO_3$, 16.3 grams of CoO, 17.8 grams of ZnO, 95.3 grams of $TiO_2$ and 9.3 grams of $SnO_2$ were made into a paste with 50 milliliters of water and homogenized. After annealing for 60 minutes at 950° C there was formed a brilliant blue-green body which was used as a pigment for plastics after grinding.

What is claimed is:

1. An inorganic pigment having the composition $$Me_2(Co_xZn_yCd_z)Ti_3O_8$$

where Me is an alkali metal and $x + y + z$ is 1 and 0 to 10% of the Ti is replaced by Sn.

2. A pigment according to claim 1 where Me is Li, Na or K and Sn is 0.

3. A pigment according to claim 2 wherein Me is Li.

4. A pigment according to claim 3, wherein $x$ is 0.4 to 0.8.

5. A pigment according to claim 3 having the formula $Li_2(Co_xZn_y)Ti_3O_8$, $x + y$ is 1 and both $x$ and $y$ are greater than 0.

6. A pigment according to claim 5 wherein x is 0.4 to 0.8.

7. A pigment according to claim 5 wherein the molar ratio of Co:Zn is from 0.5:1 to 4:1.

8. A pigment according to claim 3 having the formula $Li_2(Co_xCd_z)Ti_3O_8$, $x + z$ is 1 and both $x$ and $z$ are greater than 0.

9. A pigment according to claim 8 where $x$ is 0.4 to 0.8.

10. A pigment according to claim 1 having the formula $Me_2CoTi_3O_8$.

11. A pigment according to claim 1 having the formula $Me_2CdTi_3O_8$.

12. A pigment according to claim 1 having the formula $Me_2ZnTi_3O_8$.

* * * * *